US012596899B1

(12) United States Patent
Sheth et al.

(10) Patent No.: US 12,596,899 B1
(45) Date of Patent: Apr. 7, 2026

(54) SYSTEMS AND METHODS FOR MITIGATING SPECULAR REFLECTION

(71) Applicant: Zebra Technologies Corporation, Lincolnshire, IL (US)

(72) Inventors: Maulin Sheth, Central Islip, NY (US); Tholkappiyan Agaram-Raghupathy, Holtsville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/965,971

(22) Filed: Dec. 2, 2024

(51) Int. Cl.
    *G06K 7/14* (2006.01)
    *G06K 7/10* (2006.01)
    *H04N 23/56* (2023.01)
    *H04N 23/74* (2023.01)

(52) U.S. Cl.
    CPC ......... *G06K 7/1465* (2013.01); *G06K 7/1417* (2013.01); *G06K 7/1447* (2013.01); *H04N 23/56* (2023.01); *H04N 23/74* (2023.01); *G06K 2007/10524* (2013.01)

(58) Field of Classification Search
    CPC .. G06K 7/1404; G06K 7/1465; G06K 7/1417; G06K 7/1447; G06K 7/10732; G06K 2007/10524; H04N 23/74; H04N 23/56
    See application file for complete search history.

(56) References Cited

U.S. PATENT DOCUMENTS

| | | | | |
|---|---|---|---|---|
| 2018/0307880 A1* | 10/2018 | Gao | ................... | G06K 7/10831 |
| 2019/0318145 A1* | 10/2019 | Kuchenbrod | ........ | G06K 7/1413 |
| 2023/0114004 A1* | 4/2023 | Gurevich | ............. | H04N 23/671 |
| | | | | 235/454 |

* cited by examiner

*Primary Examiner* — Laura A Gudorf
(74) *Attorney, Agent, or Firm* — Yuri Astvatsaturov

(57) ABSTRACT

Devices, systems, and methods for mitigating specular reflection are described herein. An example system performs a ranging operation via an imaging assembly. Based upon the ranging operation, the system determines a range value associated with a distance between the imaging assembly and an object in the field of view. The system compares the range value to a threshold range value stored locally in a memory of the imaging assembly. Responsive to the range value not exceeding the threshold range value, the system perform a decode operation. Responsive to decoding the indicia contained within the at least one image, the system terminates the decode operation.

15 Claims, 6 Drawing Sheets

*300A*

*300B*

_500_

_502_

_510_

_502_

<u>600</u>

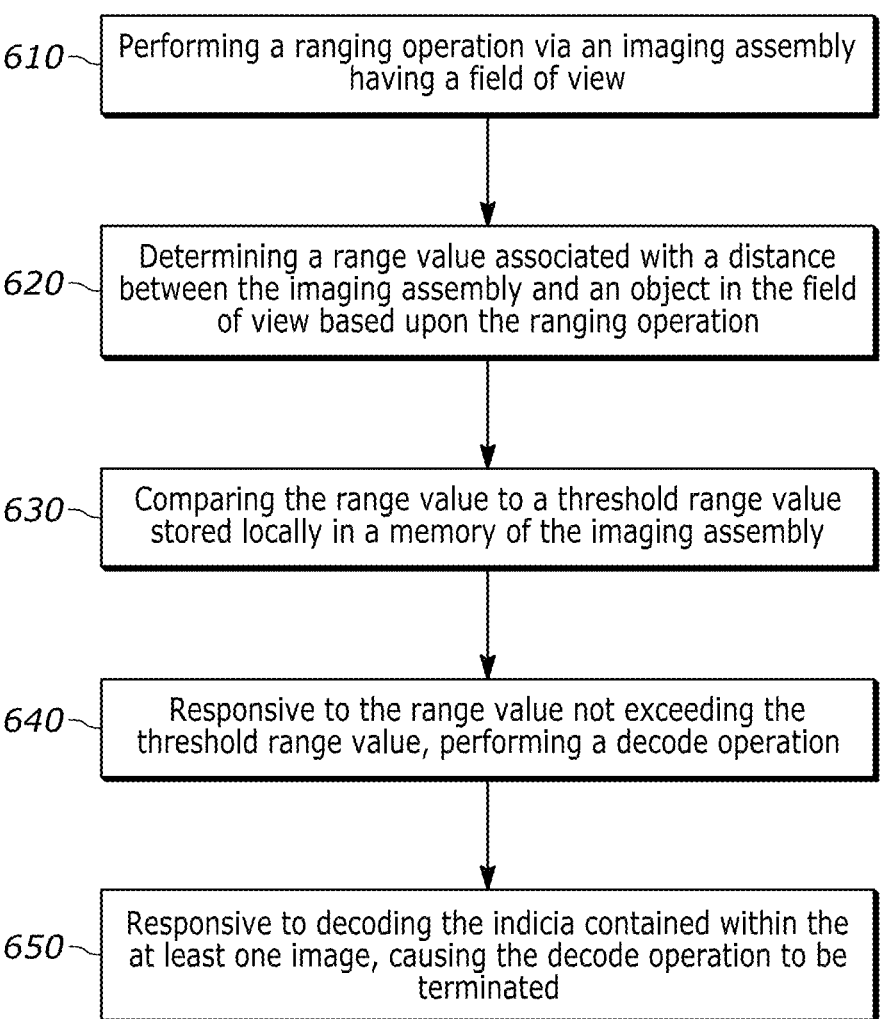

610 — Performing a ranging operation via an imaging assembly having a field of view 620 — Determining a range value associated with a distance between the imaging assembly and an object in the field of view based upon the ranging operation 630 — Comparing the range value to a threshold range value stored locally in a memory of the imaging assembly 640 — Responsive to the range value not exceeding the threshold range value, performing a decode operation 650 — Responsive to decoding the indicia contained within the at least one image, causing the decode operation to be terminated

FIG. 6

SYSTEMS AND METHODS FOR MITIGATING SPECULAR REFLECTION

BACKGROUND

An imaging device, such as a handheld indicia reader, may include an illumination source that illuminates an object during image capture. Illumination of the object may aid in decoding an indicia on the object via the captured images. Unfortunately, illuminating the object during image capture may cause a mirror-like reflection of light off the object, commonly referred to as specular reflection, that is captured in the images. The specular reflection may be a result of a higher level of illumination of the object, a close positioning of the imaging device respective to the object, a surface of the object that is prone to reflection, and/or the like.

Specular reflection may cause the indicia captured in the images to be overexposed or otherwise negatively affected such that a decoder associated with the imaging device is unable to decode the indicia in the captured images. Accordingly, there is a need for systems, methods, and/or devices that can reduce or eliminate the deleterious effects of specular reflection during image capture of an object.

SUMMARY

In an embodiment, a system for mitigating specular reflection includes: an imaging assembly having a field of view; one or more processors; and a memory associated with a particular imaging device storing instructions that, when executed by the one or more processors, cause the one or more processors to: perform a ranging operation via the imaging assembly; based upon the ranging operation, determine a range value associated with a distance between the imaging assembly and an object in the field of view; compare the range value to a threshold range value stored locally in a memory of the imaging assembly; responsive to the range value not exceeding the threshold range value, perform a decode operation comprising: capturing, via the imaging assembly having an illumination assembly that is not energized, image data comprising one or more images of the object in the field of view, providing the image data of at least one image of the one or more images to a decoding module, and analyzing the image data of the at least one image via the decoding module to decode an indicia contained within the at least one image; and responsive to decoding the indicia contained within the at least one image, cause the decode operation to be terminated.

In a variation of the embodiment, to perform the ranging operation includes instructions that, when executed by the one or more processors, cause the one or more processors to: energize an aiming light source configured to project an aiming light into the field of view; capture, via the imaging assembly, ranging image data comprising one or more ranging frames of the field of view containing the aiming light; and analyze a position of the aiming light in the one or more ranging frames to determine the range value.

In yet another variation of the embodiment, the range value includes one or more of a distance value or a focus position value.

In still yet another variation of the embodiment, the range value includes one or more of a distance value or a focus position value.

In a variation of the embodiment, the ranging operation is a second ranging operation, the decode operation is a second decode operation, and the system further comprises instructions that, when executed by the one or more processors, cause the one or more processors to perform a first ranging operation via the imaging assembly; based upon the first ranging operation, determine a first range value associated with the distance between the imaging assembly and the object; perform a first decode operation comprising: capturing, via the imaging assembly having the illumination assembly that is energized and based upon the first range value, first image data comprising a first set of one or more images of the object in the field of view, providing the first image data of at least one image of the first set of one or more images to the decoding module, and analyzing the first image data of the at least one image via the decoding module to decode the indicia contained within the at least one image of the first image data; and responsive to not decoding the indicia contained within the first image data, perform the second ranging operation.

In yet another variation of the embodiment, a cause of not decoding the indicia is specular reflection caused by illumination of the object via the illumination assembly during capture of the at least one image of the first image data.

In still yet another variation of the embodiment, the system further includes instructions that, when executed by the one or more processors, cause the one or more processors to: responsive to not decoding the indicia contained within the at least one image, perform a second ranging operation of the imaging assembly; based upon the second ranging operation, determine a second range value associated with the distance between the imaging assembly and the object; and perform a second decode operation based upon the second range value, wherein the illumination assembly is energized while capturing image data of the object in the field of view.

In a variation of the embodiment, the system further includes instructions that, when executed by the one or more processors, cause the one or more processors to: determine a specular reflection mode associated with the imaging assembly is activated, wherein performing the decode operation is further based upon the specular reflection mode of the imaging assembly being activated.

In a variation of the embodiment, the system further includes instructions that, when executed by the one or more processors, cause the one or more processors to, subsequent to capturing the one or more images, determine a ranking value of each image of the one or more images, wherein the ranking value is associated with a predicted likelihood of successful decode of a respective each image; and determine the at least one image of the one or more images to provide to the decoding module based upon respective ranking values of the one or more images, the at least one image having a greater predicted likelihood of successful decode than at least one other image of the one or more images.

In yet another variation of the embodiment, to cause the decode operation to be terminated is based upon a termination assembly.

In still yet another variation of the embodiment, responsive to the range value not exceeding the threshold range value, to perform the decode operation further comprises instructions that, when executed by the one or more processors, cause the one or more processors to capture, via the imaging assembly that is energized to provide less than maximum illumination, the image data comprising the one or more images of the object in the field of view.

In another embodiment, a method for mitigating specular reflection includes performing a ranging operation via an imaging assembly having a field of view; based upon the ranging operation, determining a range value associated with a distance between the imaging assembly and an object in the field of view; comparing the range value to a threshold range value stored locally in a memory of the imaging assembly; responsive to the range value not exceeding the threshold range value, performing a decode operation comprising: capturing, via the imaging assembly having an illumination assembly that is not energized, image data comprising one or more images of the object in the field of view, providing the image data of at least one image of the one or more images to a decoding module, and analyzing the image data of the at least one image via the decoding module to decode an indicia contained within the at least one image; and responsive to decoding the indicia contained within the at least one image, causing the decode operation to be terminated.

In yet another embodiment, a tangible machine-readable medium includes instructions that, when executed, cause a machine to at least: perform a ranging operation via an imaging assembly having a field of view; based upon the ranging operation, determine a range value associated with a distance between the imaging assembly and an object in the field of view; compare the range value to a threshold range value stored locally in a memory of the imaging assembly; responsive to the range value not exceeding the threshold range value, perform a decode operation comprising: capturing, via the imaging assembly having an illumination assembly that is not energized, image data comprising one or more images of the object in the field of view, providing the image data of at least one image of the one or more images to a decoding module, and analyzing the image data of the at least one image via the decoding module to decode an indicia contained within the at least one image; and responsive to decoding the indicia contained within the at least one image, cause the decode operation to be terminated.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 illustrate a flow diagram of an example method for mitigating specular reflection, in accordance with the disclosed techniques.

Figure 1:
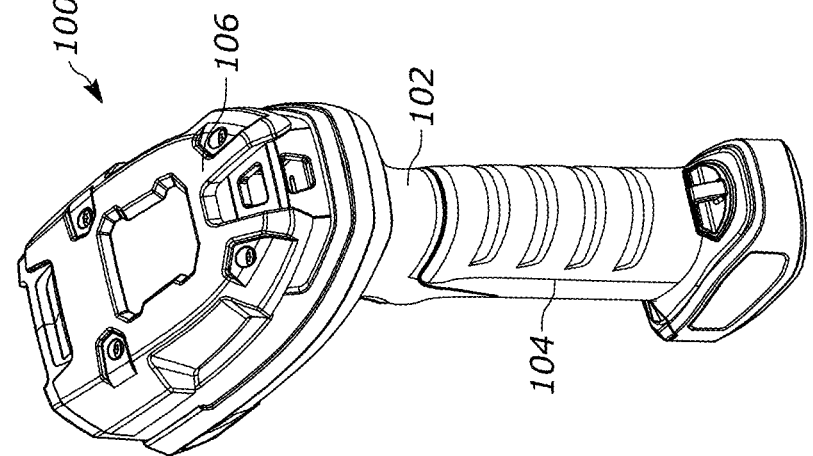
FIG. 1 illustrates a perspective front and back view of an example indicia reader, in accordance with the disclosed techniques.
Figure 1:
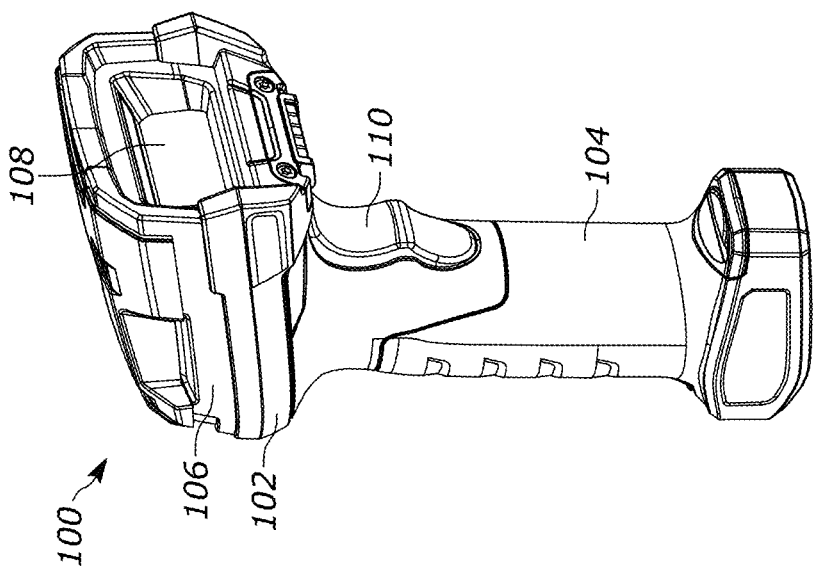

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, indicia readers or similar imaging devices generally cause specular reflection of object by illuminating the object under certain conditions, such as illumination of the object at close distance, illumination of a reflective object, etc. Specular reflection may negatively affect image capture of an object (e.g., resulting in overexposed images), detection of an object in captured images, and/or situations In particular, decoding images of an object affected by specular reflection may result in unsuccessful decodes due to the specular reflection, such as an unsuccessful decode due to overexposure of the indicia. Therefore, it is an objective of the present disclosure to provide systems, methods, and devices capable of capturing images of an object in a manner that mitigates, or entirely avoids, causing specular reflection of the object. The disclosed techniques may determine the distance between an object and the imaging device, and when the object is closer than a threshold distance from the imaging device, perform image capture of the object without any additional illumination of the object (e.g., by an illumination source of the imaging device). The lack of additional illumination can allow the imaging device to capture images with an appropriate level of exposure of the object to successfully perform indicia decoding. As a result, the imaging device may operate more efficiently when capturing and decoding the images by eliminating overexposure of objects due to specular reflection. The efficiencies gained may include a reduction of computing resource required during image capture, such as eliminating power required to energize an illumination source that would otherwise illuminate the object during image capture, in-turn providing more efficient and desirable thermal operating characteristics of the imaging device. Additional benefits include an improved success rate of decoding indicia in the captured images, avoiding the need to capture and process additional images during otherwise failed attempts at indicia decoding, and the expenditure of associated computing resources such as power to operate the imaging device, processing cycles to the analyze image data, memory to store images that are not subsequently decoded, etc. The disclosed techniques decode indicia in an expeditious manner, reducing time for a user to perform operations associated with indicia decoding, such as self-checkout at a retailer, providing a more efficient and enjoyable experience for the user.

It should be understood that the indicia and indicia scanning/decoding methods referenced herein are primarily associated with a barcode and barcode scanning/decoding for the purposes of discussion only. The systems and methods of the present disclosure may apply to any indicia (e.g., barcodes, quick response (QR) codes, a graphic, a logo, etc.) associated with an object.

Turning to the Figures, FIG. 1 illustrates an example indicia reader 100 having a housing 102 with a handle portion 104 and a head portion 106. The head portion 106 includes a window 108 and is configured to be positioned on the top of the handle portion 104. The head portion 106 includes an imaging lens (e.g., imaging lens 244 as described with regard to FIG. 2 below) that, depending on the implementation, is and/or includes a variable focus optical element.

The handle portion 104 is configured to be gripped by a reader user (not shown) and includes a trigger 110 for activation by the user. Optionally included in an embodiment is a base portion (not shown), which may be attached to the handle portion 104 opposite the head portion 106 and is configured to stand on a surface and support the housing 102 in a generally upright position. The indicia reader 100 may be used in a hands-free mode as a stationary workstation when it is placed on a countertop or other workstation surface. The indicia reader 100 may also be used in a handheld mode when it is picked up off the countertop or base station and held in an operator's hand. In the hands-free mode, products may be slid, swiped past, or presented to the window 108 for the reader to initiate barcode reading operations. In the handheld mode, the indicia reader 100 may be moved towards a barcode on a product, and the trigger 110 may be manually depressed or engaged to initiate imaging of the barcode.

Other implementations may provide only handheld or only hands-free configurations. In the embodiment of FIG. 1, the indicia reader 100 is ergonomically configured for a user's hand as a gun-shaped housing 102, though other configurations may be utilized as understood by those of ordinary skill in the art. As shown, the handle portion 104 extends below and rearwardly away from the housing 102 along a centroidal axis obliquely angled relative to a central axis of a field of view (FOV) of an imaging assembly within the head portion 106.

Figure 2:
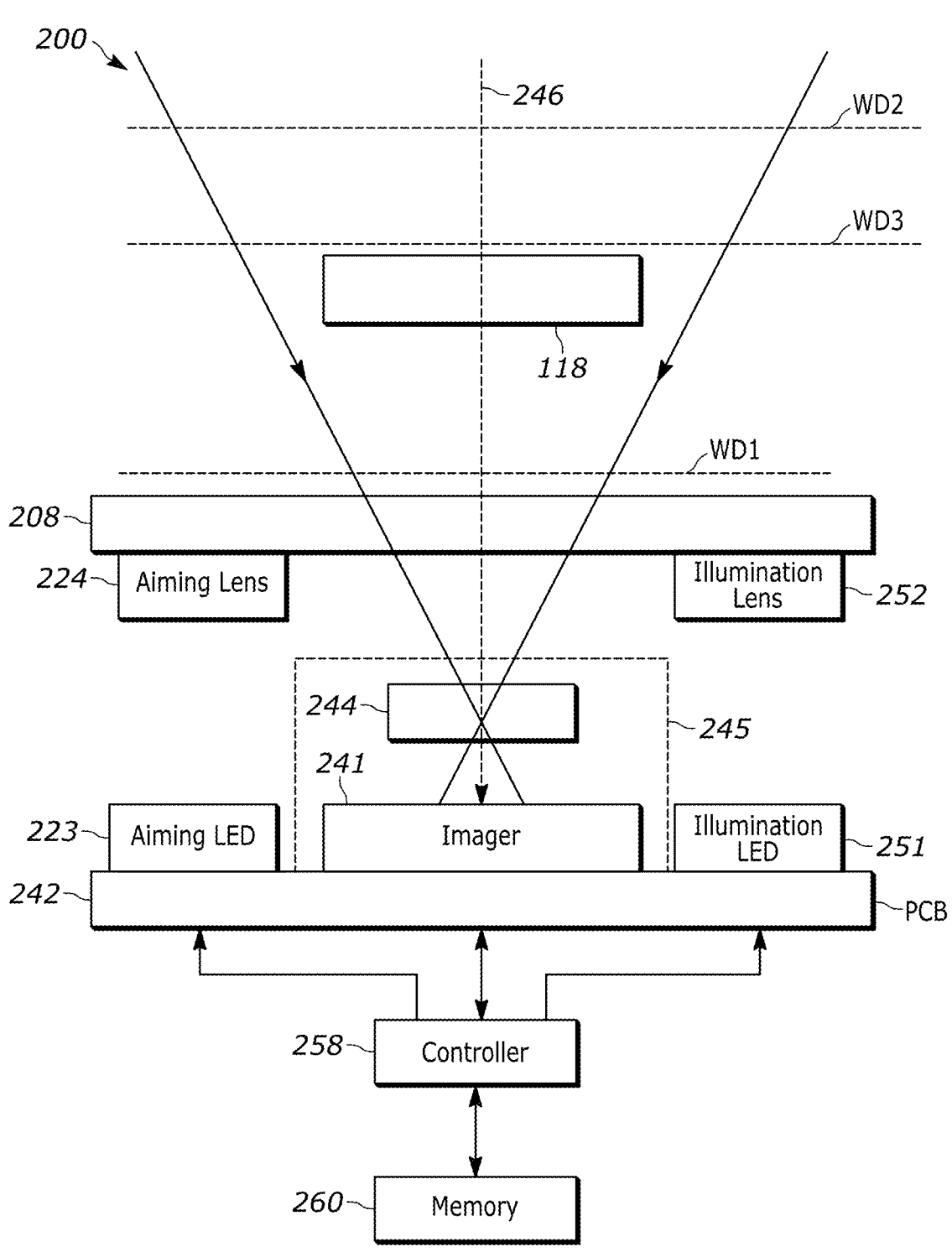
FIG. 2 illustrates a block diagram of an example imaging device, in accordance with the disclosed techniques.

FIG. 2 illustrates a block diagram of an example architecture of an imaging device 200, such as the handheld indicia reader 100, according to the disclosed techniques. In at least some implementations, an imaging assembly 245 includes a light-detecting sensor or imager 241 operatively coupled to, or mounted on, a printed circuit board (PCB) 242 of the imaging device 200. The imager 241 may include a solid-state device, for example, a charge-coupled device (CCD) or a complementary metal-oxide semiconductor (CMOS) imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a FOV along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In at least some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the FOV. The imaging lens 244, which in at least some of the imaging device 200 implementations is included in the imaging assembly 245, is operative for focusing the return light onto the array of image sensors to enable the object 118 to be imaged. In particular, the light that impinges on the pixels is sensed and the output of those pixels produce image data that is associated with the environment that appears within the FOV (which may include the object 118). This image data is typically processed by a controller (usually by being sent to a decoder) which identifies and decodes decodable indicia captured in the image data. Once the decode is performed successfully, the imaging device 200 may signal a successful "read" of the object 118 (e.g., a barcode). The object 118 may be located anywhere in a working range of distances between a close-in working distance (WD1) and a far-out working distance (WD2). In an implementation, WD1 is about one-half (0.5) inch from the window 208, and WD2 is about thirty (30) inches from the window 208.

In at least some implementations, the imaging lens 244 includes a variable focus optical element. In further implementations, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a focus range from one-half (0.5) inches extending infinitely (i.e., to optical infinity). In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 258 may control the variable focus optical element. Though not shown, additional optical elements, such as collimators, lenses, apertures, compartment walls, etc. may be provided in the imaging device 200.

An illumination assembly may also be mounted in, attached to, or associated with, the imaging device 200. The illumination assembly includes an illumination source 251 and at least one illumination lens 252. The illumination source 251 may include a plurality of illumination components (e.g., multiple light emitting diodes (LEDs)). Similarly, the illumination lens 252 may include one or more lenses. The imaging device 200 may include a plurality of illumination source 251 and/or at least one illumination lens 252, configured to generate a substantially uniform distributed illumination pattern of illumination light on and along the object 118 to be imaged by image capture. At least part of the scattered and/or reflected return light is derived from the illumination pattern of light on and along the object 118.

Although FIG. 2 illustrates a single illumination source 251, it will be understood that the imaging device 200 may include more illumination sources. In at least one implementation, the illumination source 251 may include a near field illumination source, such as a near field LED, and a far field illumination source, such as a far field LED. The near field illumination source may be suitable for illuminating objects nearer to the imaging device 200 (e.g., when capturing an image of the object 118, which may include an indicia for decoding) as compared to the far field illumination light source which may be a suitable illumination light source for illuminating the object 118 farther from the imaging device 200.

The illumination components comprising the illumination source 251 may be individually and/or non-simultaneously energized, simultaneously energized, or any combination thereof. Illuminating the object 118 using the most appropriate illumination source 251 (e.g., one or more illumination components of the near field illumination source, one or more illumination components of the far field illumination source), or no illumination source at all, may provide improved exposure of the object/indicia in the captured images. In at least one implementation, the illumination components of the illumination source 251 may have different illumination capabilities, power levels or other illumination characteristics from one another. For example, different illumination components may comprise the illumination source 251, e.g., one or more of infrared (IR), LED, organic LED (OLED), etc.

In at least one implementation, one or more illumination components of the illumination source 251 may be energized by a power source having variable operating characteristics, e.g., the power source output can be varied using one or more of a duration of an electrical pulse, a current of a duty cycle, etc. Adjusting and/or varying the power level of the illumination source 251 may cause a corresponding variation in the illumination intensity of the illumination source 251. For example, operating LEDs comprising the illumination source 251 at full power may provide a higher illumination intensity than operating the LEDs at half power. Accordingly, to further optimize illuminating the object 118 and/or the exposure level of an image of the object 118, one or more illumination components of the light sources 251 may remain unenergized, be partially energized, be fully energized, be intermittently energized at specific times with intensities, etc., based upon the distance between the imaging device 200 or otherwise imaging assembly 245 and the object 118 during image capture. The illumination can be reduced all at once, gradually (e.g., in a stepwise fashion), and/or any combination thereof.

An aiming light assembly may also be mounted in, attached to (e.g., the PCB 242), or associated with the imaging device 200. The aiming light assembly preferably includes an aiming light source 223 (e.g., one or more aiming LEDs and/or laser light sources) and an aiming lens 224 for generating and directing a visible aiming light beam away from the imaging device 200 onto the object 118 in the direction of the FOV of the imager 241.

The imager 241, the illumination source 251, and the aiming light source 223 may be operatively connected to, and controlled by, a programmed microprocessor or controller 258. In at least some implementations, the controller 258 is or includes an imaging processor as described herein. In at least some implementations, the controller 258 functions as, or is communicatively coupled to, an imaging processor for receiving, processing, and/or analyzing the image data captured by the imagers. For example, in one embodiment, the imaging device 200 includes an indicia decoder (e.g., such as a barcode scanner) in communication with the imager 241, and configured to receive the image data, locate and/or decode one or more indicia captured in the image data.

Although FIG. 2 shows the imager 241, the illumination source 251, and the aiming light source 223 as being mounted on the same PCB 242, it should be understood that different implementations of the imaging device 200 may have these components each on a separate PCB, or in different combinations on separate PCBs. For example, in an implementation of the imaging device 200, the illumination LED source 251 is provided as an off-axis illumination (i.e., has a central illumination axis that is not parallel to the central FOV axis).

A memory 260 is connected and accessible to the controller 258. The memory may store image data captured by the imaging assembly 245, store range values and other data associated therewith, among other things.

In at least some implementations, the object 118 is, or includes, an indicia for decoding (e.g., a decode indicia), such as a barcode, a QR code, a label, a UPC code, a digital matrix code, logo, image, etc. In further implementations, the object 118 is, or includes, a digital watermark that includes a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

In at least some embodiments, to determine the distance between the object 118 and the imaging assembly 245 or otherwise imaging device 200, the imaging device 200 may perform a ranging operation. To perform the ranging operation, the imaging device 200 may project an aiming pattern (e.g., via the aiming light source 223 and aiming lens 224) onto the object 118 and within its FOV. The FOV of the imaging assembly 245 may include multiple regions, and based on the region the aiming pattern falls into when reflecting off the object 118, the imaging device 200 may determine the distance between the imaging assembly 245 and the object 118.

Figure 3A:
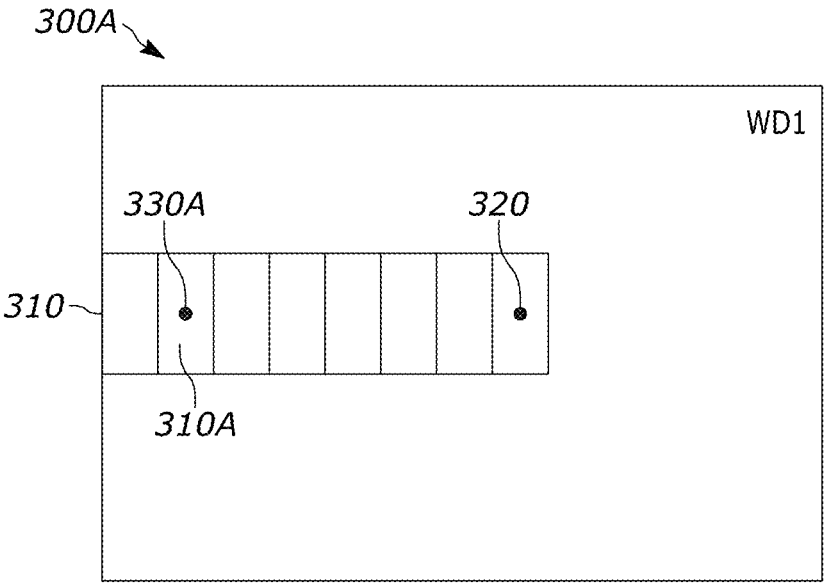
FIG. 3A illustrates an example aiming pattern on an object located at a close-in distance from an example imaging device, in accordance with the disclosed techniques.
Figure 3B:
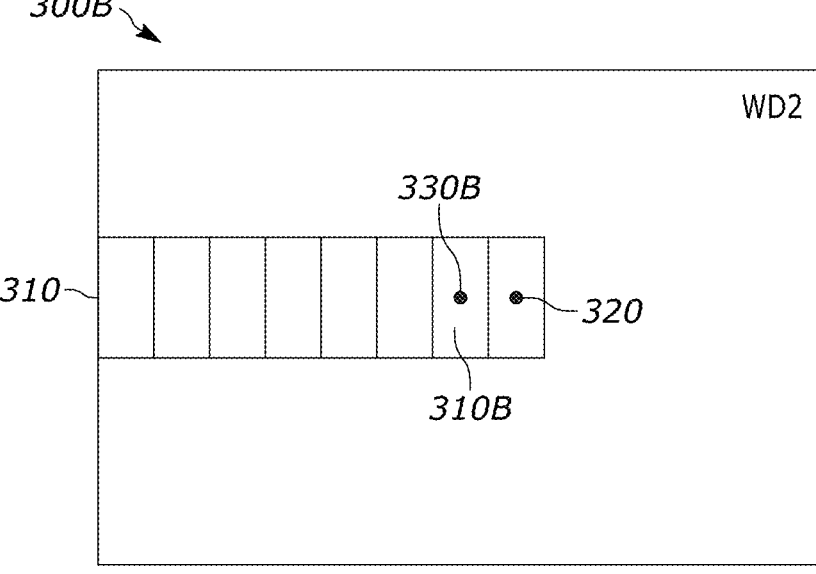
FIG. 3B illustrates an example aiming pattern on an object located at a far-out distance from an example imaging device, in accordance with the disclosed techniques.

FIGS. 3A and 3B illustrate aiming patterns 330A, 330B depicted in a close-in FOV 300A and far-out FOV 300B, respectively. The close-in FOV 300A at may include a first working distance (WD1) similar to WD1 of FIG. 2, and the far-out FOV 300B may include a far-out working distance (WD2) similar to WD2 of FIG. 2. Each of the FOVs 300A and 300B are divided into a plurality of imaging regions 310. Although the exemplary embodiments of FIGS. 3A and 3B depict eight imaging regions 310 of equal size, it should be understood that this is for case of illustration, and depending on the embodiment the FOVs 300A and/or 300B may include an alternate number of imaging regions 310 (e.g., four, sixteen, thirty-two regions, etc.). Moreover, the imaging regions 310 may be of different shapes and/or sizes than those of FIGS. 3A and 3B.

Performing the ranging operation (e.g., via the controller 258 and/or imaging processor of imaging assembly 245) may include the imaging assembly capturing ranging image data comprising one or more ranging frames (e.g., images) of its FOV to determine a distance between a center point 320 of the imaging regions 310, and a respective the aiming pattern 330A, 330B projected onto the object 118. Based on which region of the multiple imaging regions 310 the aiming pattern 330A and/or 330B falls into when analyzing the ranging image data, the imaging device 200 determines a distance between the imaging device 200 and the object 118. The imaging device 200 may use parallax techniques to determine the distance between the imaging device 200 and the object 118. For example, in the exemplary embodiment of FIG. 3A, the imaging device 200 captures ranging images of its FOV to determine the aiming pattern 330A is in a second region 310A of the multiple imaging regions 310, the second region 310A located six regions to the left of the center point 320 (e.g., according to the imaging axis 246). The imaging device 200 determines that the object 118 is at a distance of WD1 based upon the presence of the aiming pattern 330A in the second region 310A. In the example of the exemplary embodiment of FIG. 3B, the imaging device 200 captures ranging image data of its FOV to determine the aiming pattern 330B is in a seventh region 310B located one region to the left of the center point 320. Based upon the aiming pattern 330B appearing the seventh region, the imaging device 200 determines that the object 118 is at distance of WD2.

Performing the ranging operation may include determining a range value (e.g., numerical value). The range value may correspond to a single distance value (e.g., four inches) between the imaging device 200 and the object 118, a range of distance values (e.g., distances between one inch to two inches) between the imaging device 200 and the object 118, and/or any combination thereof. In at least some embodiments, the range value may include, or otherwise indicate, the distance value and/or a focus position value. The controller 258 may use the focus position value to configure the variable focus optical element of the imaging assembly 245, and/or configure other operational parameters or settings associated with image capture (e.g., focal distance, focal length, frame rate, exposure, aperture, shutter speed, ISO, etc.) by the imaging device 200.

As disclosed herein, the range value is proportional to the distance between the imaging assembly 245 and the object 118, such that as the distance between the imaging assembly 245 and the object 118 increases, the corresponding range value also increases. For example, a distance of two inches between the imaging assembly 245 and the object 118 has a lower range value than a distance of eight inches between the imaging assembly 245 and the object 118. However, it should be understood that in other embodiments, the range value may be inversely proportional to the distance between the imaging assembly 245 and the object 118 (e.g., as the distance between the imaging assembly 245 and the object 118 increases, the corresponding range value decreases), and/or have an alternate correspondence.

In at least some implementations, the imaging device 200 may store information from the ranging operation in memory, such as storing ranging image data, one or more distances, and/or one or more range values in memory. For example, the controller 258 may store a distance and associated range value from a ranging operation as a look-up table (LUT) in the memory 260 of the imaging device 200.

In at least some implementations, the imaging device 200 may illuminate its FOV when capturing image data, for example so an indicia (e.g., on an object 118) in the FOV may be sufficiently illuminated for decoding purposes. To determine the appropriate and/or optimal illumination the object 118 within the FOV when capturing the image data, the imaging device 200 may perform the previously-described ranging operation by energizing an aiming light source (e.g., the aiming light source 223) configured to project an aiming light into the FOV. The imaging assembly (e.g., the imaging assembly 245) may capture one or more ranging frames of the FOV containing the aiming light projected onto the object 118, and analyze a position of the aiming light (e.g., its location in one or many imaging regions 310) in the one or more ranging frames to determine a range value associated with the distance between the imaging assembly of the imaging device 200, and the object 118 within the FOV.

The imaging device 200 (e.g., via the controller 258) may compare the range value to a threshold range value stored locally in a memory of the imaging assembly (e.g., the memory 260). One or more threshold range values may be associated with the type or level of illumination, if any, the imaging device 200 will emit when capturing image data of the object 118 for performing a decode operation. For example, when the range value exceeds the threshold range value, the imaging device 200 (e.g., via the controller 258) may fully energize the illumination source 251 during image capture of the object 118, whereas when the range value does not exceed the threshold range value the imaging device 200 (e.g., via the controller 258) may not fully energize (e.g., minimal illumination or no illumination) the illumination source 251 during image capture of the object 118. In at least some embodiments, the imaging device 200 may store multiple threshold range values, one or more of which may be associated with different types of levels of illumination than other threshold range values.

For the purposes of discussion herein, the threshold range value may be associated with a distance that may cause specular reflection when illuminating the object 118 at a distance that is nearer to the imaging assembly 245 than the distance associated with the threshold range value (e.g., the range value does not exceed the threshold range value). For example, the threshold range value may be associated with a distance of three inches, and when the ranging operation indicates the distance between the object 118 and the imaging assembly 245 is less than three inches and thus does not exceed the threshold range value, illuminating the object 118 during image capture (e.g., for subsequent indicia decoding) may result in specular reflection of the object 118 in the captured images. Thus, by implementing a threshold range value, the imaging device 200 may determine whether to provide illumination, and/or what type or level of illumination to provide, to avoid specular reflection of the object 118 in captured image data.

In at least some implementations the threshold range value may be configurable. In some such implementations, a user may configure the threshold range value. For example, a user interface of the imaging device 200 may allow a user to configure the threshold range value, or a user of a computing device communicatively coupled to the imaging device 200 may configure the threshold range value via the computing device. In some such implementations, the threshold range value may be configurable via one or more applications, algorithms, logic, models, and/or other artificial intelligence. For example, a computing device may execute an image analysis model to analyze historical images of illuminated objects at various distances from the imaging device 200 to detect whether specular reflection of the object was a cause of the non-decode. Based upon the image analysis, the computing device may configure the threshold range value. In another example, the object (e.g., material, size, shape), environment (e.g., distance to object, lighting), the indicia (e.g., material, pattern, size, shape, color), or type of scanning operation (e.g., inventory scanning at close proximity to an object) may determine the threshold range value. However, the threshold range value may be configurable in any other suitable manner.

Responsive to the range value not exceeding the threshold range value (e.g., the object 118 is closer in distance to the imaging device 200 than the distance associated with the threshold range value), the imaging device 200 may perform a decode operation. The decode operation may include capturing image data via the imaging assembly 245 comprising one or more images of the object 118 in the FOV of the imaging assembly 245 while the illumination assembly (e.g., the illumination source 251) is not energized. In at least some implementations, rather than the illumination assembly being deenergized, the imaging assembly may be energized to provide less than maximum illumination while capturing at least some of the images of the image data. For example, the imaging assembly 245 may provide 10% illumination during image capture respective to the maximum possible illumination. For the purposes of discussion herein, referring to the illumination assembly as deenergized, not energized, and the like includes the illumination assembly being energized to provide less than maximum illumination.

Capturing the image data while the illumination assembly is not energized can prevent specular reflection of the object 118 and/or associated indicia in the captured images that would otherwise be caused if the illumination assembly was energized. Using the threshold range value to determine whether, and/or at what level of illumination, to energize the illumination assembly during image capture may not only mitigate or entirely avoid specular reflection of the object 118, but also provides the advantage of expending fewer computing resources during image capture by avoiding the use of power to energize the illumination assembly, eliminating computing resources otherwise required to generate signals via the controller 258 that cause the illumination assembly to energize, etc., Moreover, there is an increased likelihood that an indicia captured in the image data can be decoded when it is not affected by specular reflection, which further avoids using computing resources otherwise required when unsuccessfully decoding an indicia affected by specular reflection, such as power to capture the non-decodable images affected by specular reflection via the imaging assembly 245, memory to store the non-decodable images, processing cycles attempting to decode the non-decodable images, etc.

Performing the decode operation may include providing image data including at least one captured image to a decoding module, otherwise referred to at times herein as a decoder. The decoding module may include software and/or hardware that may reside, at least in part, on the imaging device 200 (e.g., located within the housing of the imaging device 200) or may be located, at least in part, remotely from, and in communication with, the imaging device 200 (e.g., a decoding module at a server, point-of-sale, or otherwise host communicatively coupled to the imaging device 200). The decoding module may be configured to analyze one or more images of the image data in an attempt to decode an indicia contained within one or more of the images.

In at least some implementations, subsequent to capturing the one or more images during the decode operation, the imaging device 200 (e.g., via the controller 258 and/or other suitable device or component) may determine a ranking value associated with one or more of the captured images before providing the captured images to the decoding module. The ranking value (e.g., numerical value, score, or otherwise value) may be associated with, or otherwise indicate, a predicted likelihood of successful decode of a respective image. For example, the ranking value may be determined at least in part based upon the level of brightness or exposure of the indicia in the image. For example, too much or too little brightness or exposure of the indicia in a particular image may cause indicia decoding to fail. Accordingly, images with less desirable characteristics respective to decoding may have a ranking reflecting their undesirability as compared to images with an appropriate level of brightness or exposure that have a higher likelihood of resulting in a successful decode. In some such implementations, the imaging device 200 (e.g., via the controller 258 and/or other suitable device or component) may determine at least one image to provide to the decoding module based upon respective ranking values of the images, wherein the at least one image has a greater predicted likelihood of a successful decode than at least one other image of the captured images.

Responsive to the decoding module successfully decoding the indicia contained within at least one image, the decode operation may be terminated. In at least some embodiments, the decode operation is terminated based upon a termination assembly. For example, the imaging device or other suitable component (e.g., a component performing the decode operation and/or otherwise associated with the decode operation such as a decode module, a server, a host, a point-of sale, the controller 258, etc.) may generate the termination signal.

In at least some implementations, the decode operation does not result in the decode module successfully decoding the indicia contained within image(s) captured with a fully or partially deenergized illumination assembly. For example, the exposure of the object 118 may be inadequate to decode the object's indicia because the object 118 was not illuminated during image capture. In some such implementations, the imaging device 200 (e.g., via the imaging assembly 245) may capture images of the object 118 (e.g., via the imaging assembly 245) while the illumination assembly is energized, which may cause images of the illuminated object 118 to result in a successful decode by the decode module. Accordingly, the imaging device 200 may perform a second ranging operation. Based upon the second ranging operation, the imaging device 200 (e.g., via the controller 258) may determine a second range value associated with the distance between the imaging assembly and the object 118 during the second ranging operation. The imaging device 200 may perform a second decode operation based upon the second range value, wherein the illumination assembly is energized while capturing image data of the object 118 in the field of view.

In at least some embodiments, performing the decode operation with a deenergized illumination assembly may be performed only when a specular reflection mode associated with the imaging assembly 245 or otherwise imaging device 200 is activated. For example, when the specular reflection mode is not activated, the imaging assembly 245 may not perform image capture with the illumination assembly deenergized based upon the range value not exceeding the threshold range value, but rather may provide some form of illumination via the illumination assembly when capturing images of the object 118 and/or may not compare the range value to a range value threshold in advance of performing the decode operation. However, when the specular reflection mode is activated, the aforementioned decode operation with the deenergized illumination assembly based upon comparing the range value to a range value threshold may occur. In such instances, the imaging device 200 may determine (e.g., via the controller 258 and/or other suitable device or component) that a specular reflection mode associated with the imaging assembly is activated in advance of performing the decode operation.

In at least some implementations, the ranging operation providing the range value that is compared with a threshold range value is a second ranging operation. Similarly, the subsequent decode operation with a deenergized illumination assembly performed responsive to the range value not exceeding the threshold range value may a second decode operation. In some such implementations, the second ranging operation and the second decode operation may be preceded by a first ranging operation and a first decode operation. After performing the first ranging operation via the imaging assembly 245, the imaging device 200 may determine a first range value associated with the distance between the imaging assembly and the object 118. The imaging device 200 may perform the first decode operation based upon the first range value, the first decode operation including capturing first image data comprising a first set of one or more images of the object 118 in the field of view based upon the first range value. During the first image capture operation, the illumination assembly is energized while capturing the first image data via the imaging assembly 245. Accordingly, the imaging device 200 does not need to compare the first range value to a range value threshold to determine whether to deenergize the illumination assembly since the first image capture operation is intended to have the illumination assembly energized. The first decode operation may include providing the first image data of at least one image of the first set of images to the decoding module. The decode module may analyze the first image data of the at least one image to decode the indicia contained within the received first image data. Responsive to not decoding the indicia contained within the first image data (e.g., potentially due to specular reflection of the object 118), the imaging device 200 may perform the previously described ranging operation.

It at least some embodiments, performing the decode operation with a deenergized illumination assembly may only occur when a specular reflection mode associated with the imaging assembly 245 or otherwise imaging device 200 is activated. For example, when the specular reflection mode is not activated, the imaging assembly 245 may not perform image capture with the illumination assembly deenergized based upon the range value not exceeding the threshold range value, but rather may provide some form of illumination via the illumination assembly when capturing images of the object 118 and/or may not compare the range value to a range value threshold in advance of performing the decode operation. However, when the specular reflection mode is activated, the aforementioned decode operation with the deenergized illumination assembly based upon comparing the range value to a range value threshold may occur. In such instances, the imaging device 200 may determine (e.g., via the controller 258 and/or other suitable device or component) that a specular reflection mode associated with the imaging assembly is activated in advance of performing the decode operation.

Figure 4:
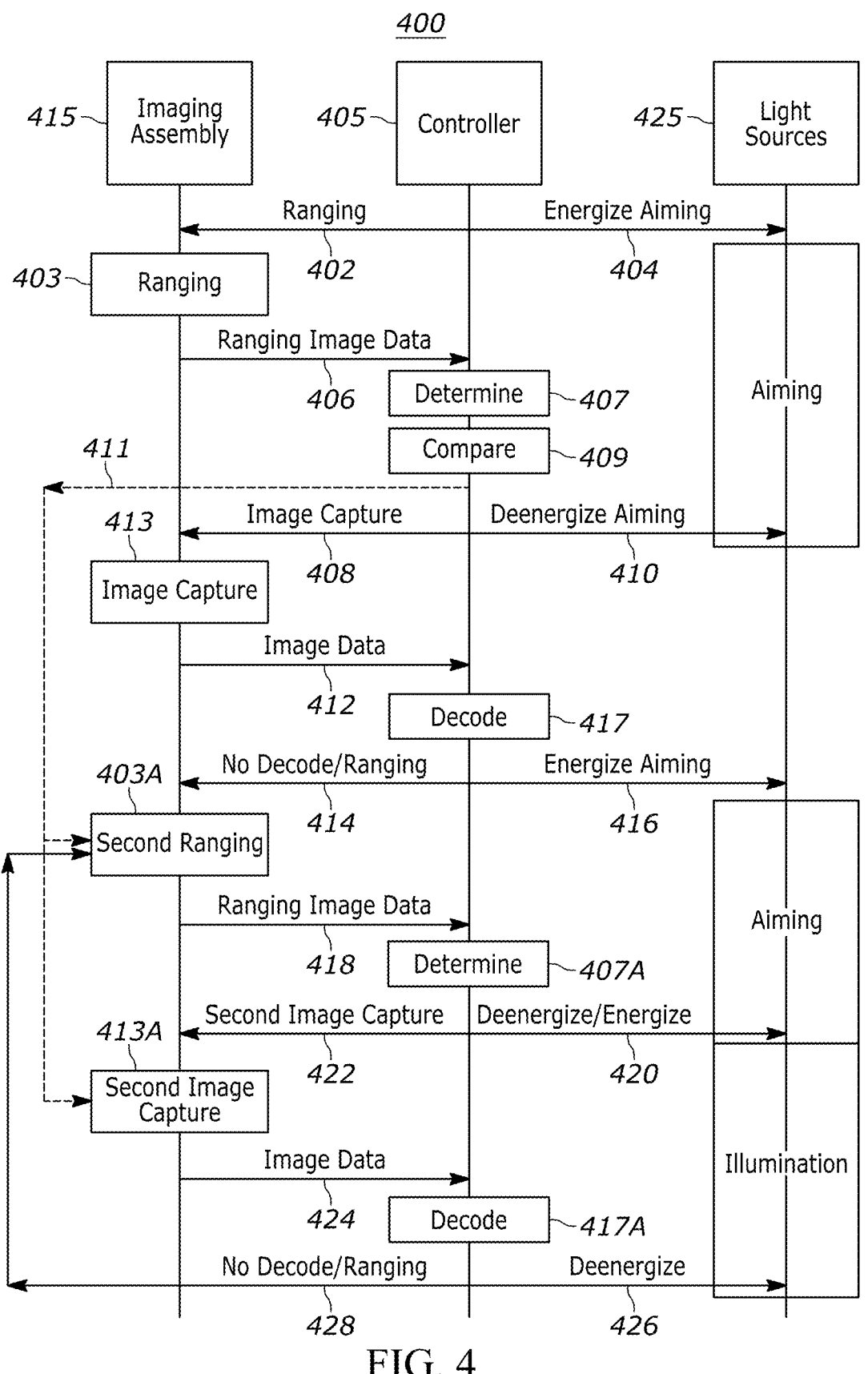
FIG. 4 illustrates a logic diagram of an example imaging device mitigating specular reflection, in accordance with the disclosed techniques.

FIG. 4 depicts an example logic diagram 400 of an imaging device (e.g., the imaging device 200) mitigating specular reflection, according to embodiments. The imaging device may include a controller 405 (e.g., the controller 258) in communication with an imaging assembly 415 (e.g., the imaging assembly 245) and light sources 425 including an aiming source (e.g., aiming light source 223) and an illumination light source (e.g., illumination source 251). The transmission described below may be, or include, one or more signals, messages, instructions, commands, images, packets, and/or other suitable transmissions between the controller 405, imaging assembly 415, and/or light sources 425. In at least some implementations, one or more of the controller 405, the imaging assembly 415, and/or light sources 425 may be components of the same device (e.g., located within the same housing of the imaging device 200), and in at least some implementations, one or more of the controller 405, the imaging assembly 415, and light sources 425 may be components of different devices.

The controller 405 initializes the scenario of FIG. 4 by generating and transmitting a transmission 402 to the imaging assembly 415 to initiate a ranging operation 403. The controller 405 also generates and transmits a transmission 404 to the light sources 425 to energize the aiming light source for performing the ranging operation 403. In at least some implementations, the controller 405 generates the transmissions 402 and/or 404 in response to a user engaging a trigger (e.g., trigger 110) of an imaging device (e.g., the indicia reader 100, imaging device 200) comprising the controller 405, the imaging assembly 415 and the light sources 425 to decode an indicia on an object within the FOV of the imaging device.

In response to transmission 404, the aiming light source is energized by the light sources 425 to provide an aiming pattern (e.g., the aiming pattern 330A, 330B) during the ranging operation 403. In response to transmission 402, the imaging assembly 415 captures ranging image data (e.g., one or more ranging frames) during the ranging operation 403, and transmits 406 the ranging image data from the ranging operation 403 to the controller 405. Upon receiving the ranging image data from the ranging operation 403, the controller 405 analyzes at least a portion of the ranging image data to determine 407 a range value associated with a distance between the imaging assembly 415 and an object (e.g., the object 118) in the field of view. The range value may include a distance value and/or a focus position value (e.g., based upon a configured sweet spot of the imaging device).

The controller 405 compares 409 the range value to a threshold range value (e.g., stored locally in memory). The comparison 409 may indicate whether the object is located as such a distance from the imaging device (e.g., a close-in distance) that results in a performing an image capture with the illumination light source of the light sources 425 deenergized to prevent specular reflection. Responsive to the range value not exceeding the threshold range value, the controller 405 may initiate image capture via the imaging assembly 415 as part of a decode operation.

In at least some embodiments, subsequent to, and/or as part of, the comparison 409, the controller 405 may determine whether a specular reflection mode associated with the imaging assembly 415 or otherwise imaging device is activated. In such embodiments, when the specular reflection mode of the imaging assembly is activated, the controller 405 may proceed to initiate an image capture operation 413. When the specular reflection mode of the imaging assembly is not activated, the controller 405 may transmit 411 a signal causing the imaging device to perform a second ranging operation 403A (e.g., to determine a second range value) or a second image capture operation 413A (e.g., using the determined 407 range value from the first ranging operation 403).

To perform the image capture operation 413, the controller 405 transmits 408 a signal to the imaging assembly 415. The signal may include the range value, distance value, and/or focus position value, for example for the imaging assembly 415 to configure one or more operational parameters associated with capturing the image data. The controller 405 may also generate a transmission 410 to the light sources 425 that includes a signal to deenergize the aiming light source (e.g., based upon the completion of the ranging operation 403). The transmission 410 does not cause the deenergized illumination light source to energize since the comparison 409 determines the range value does not exceed the threshold range value.

The transmission 408 causes the imaging assembly 415 to perform the image capture operation 413 by capturing image data comprising one or more images of the object within the field of view of the imaging assembly 415. The imaging assembly 415 may use information in the transmission 408, such as the focus parameters, when capturing the image data. The imaging assembly 415 transmits 412 at least a portion of the image data from the image capture operation 413 to the controller 405. Although FIG. 4 depicts the imaging assembly 415 as capturing the image data in a single step and transmitting the image data via a single transmission 412, it should be understood the imaging assembly 415 may capture and/or transmit image data via multiple steps, such as capturing separate sets of image data and transmit each set individually once captured, capture and/or transmit less than all the images in separate transmissions, etc.

Next, the controller 405 analyzes at least a portion of the image data (e.g., via a decoding module) to decode 417 the indicia, such as a barcode, in the image data of transmission 412. In at least some embodiments, the controller 405 and/or other suitable component may determine a ranking value of one or more images of the image data, the ranking value associated with a predicted likelihood of successful decode of a respective each image. The controller 405 may determine one or more images (e.g., images having a greater predicted likelihood of a successful decode) to provide to the decoding module for decoding. Responsive to a successful decode, the decode 417 operation is terminated.

If the controller 405 does not successfully decode indicia during the decode 417, the controller 405 may initiate a second ranging operation 403A. The controller 405 transmits 414 a signal to the imaging assembly 415 to initiate the second ranging operation 403A, which may operate similarly to the first ranging operation 403. The controller 405 also transmits 416 a signal to the light sources 425 to energize the aiming light source proximate the second ranging operation 403A, as was similarly done with transmission 404.

In response to transmission 414, the imaging assembly 415 performs the second ranging operation 403A by capturing one or more ranging images during the second ranging operation 403A. The imaging assembly 415 transmits 418 the ranging image data from the second ranging operation 403A to the controller 405, for the controller 405 to determine 407A a second range value. The controller 405 transmits 422 a signal including the second range value and any associated data to the imaging assembly 415.

The controller 405 transmits 420 a signal to the light sources 425, causing the light sources 425 to deenergize the aiming light source proximate the completion of the second ranging operation 403A. The transmission 420 also causes the light sources 425 to energize an appropriate illumination source (e.g., the near field LED or far field LED) based upon the second range value. For example, the second range value may be associated with an illumination intensity, causing the light sources 425 to energize the illumination light source 425 based upon the illumination intensity.

Responsive to transmission 422, the imaging assembly 415 performs a second image capture operation 413A to capture one or more images while the illumination source is energized. The imaging assembly 415 transmits 424 image data from the second image capture operation 413A to the controller 405. The controller 405 attempts to decode an indicia located in the image data via decode operation 417A. Based upon a successful decode from the decode operation 417A, the controller 405 transmits 426 a signal to the light sources 425, causing the illumination source of the light sources 425 to deenergize. Based upon an unsuccessful decode from the decode operation 417A, the controller 405 transmits 428 a signal causing the imaging device to perform another ranging operation, similar to the second ranging operation 403A.

In at least some implementations, the imaging device may be configured to perform an initial ranging operation and initial imaging operation, before performing the ranging operation 403 and image capture operation 413. The initial ranging operation and initial imaging operation may be similar to the second ranging operation 403A and second image capture operation 413A in that there is no compare step (e.g., comparison 409) to determine whether the initial range value of the initial range operation exceeds a threshold range value. As such, the initial image capture operation may include capturing initial images with the illumination light source of the light sources 425 energized. In some such implementations, the initial image capture with the illumination light source energized may cause specular reflection of the object in the initially captured images, resulting in an unsuccessful decode of the image data by the decode module. If an unsuccessful decode does occur, the controller may initiate the ranging operation 403 and subsequent image capture operation 413 that does include the comparison 409 to determine whether the illumination light source should be deenergized during the image capture operation 413.

Figure 5A:
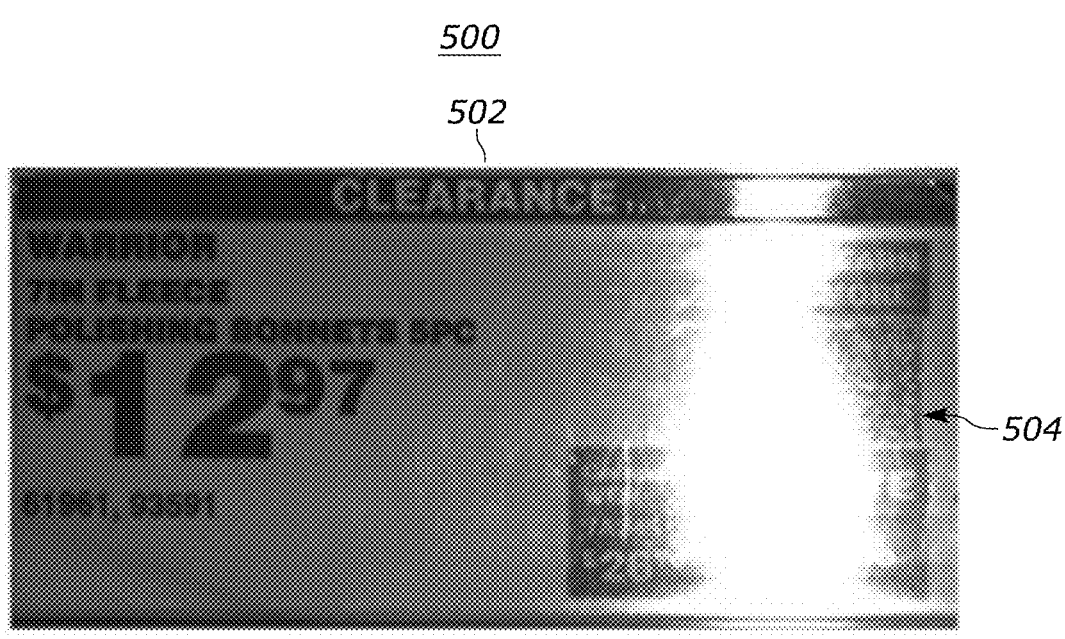
FIG. 5A depicts an image of an example object affected by specular reflection, in accordance with the disclosed techniques.

FIG. 5A depicts an image 500 of an example object affected by specular reflection. The image 500 includes a label 502 having a barcode 504 illuminated by the illumination source (e.g., the illumination source 251, the light sources 425) during an image capture operation (e.g., the second image capture operation 413A). As previously described, the specular reflection may cause the decode module to unsuccessfully decode the barcode 504 in the image 500 affected by the specular reflection, for example because the barcode 504 is overexposed and unable to be interpreted. The image 500 may be representative of the types of images the disclosed systems and methods are configured to avoid by performing an image capture operation with the illumination source deenergized in situations that may other result in images affected by specular reflection.

Figure 5B:
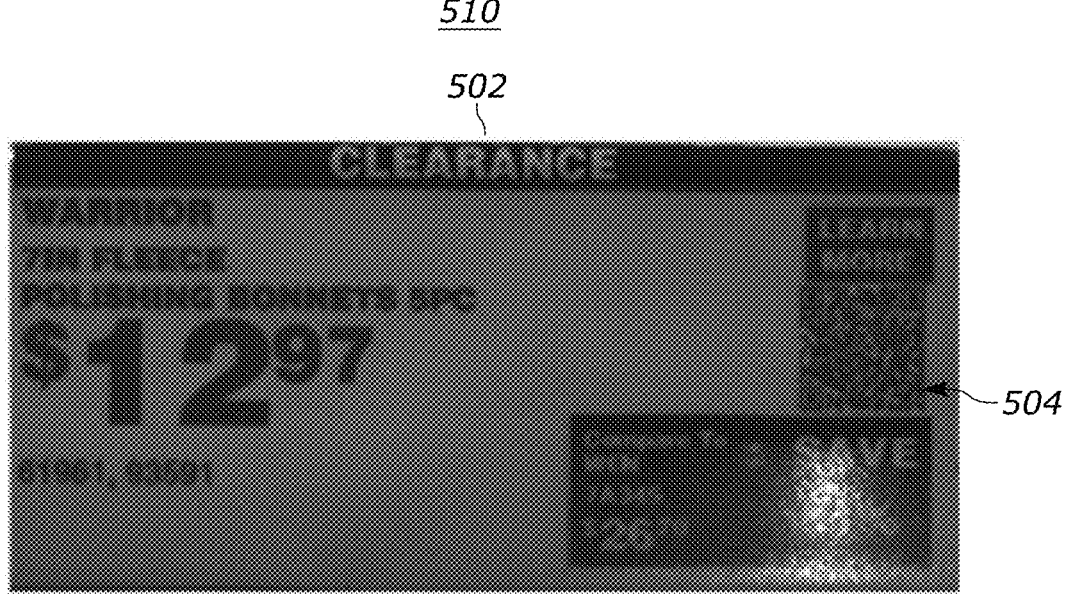
FIG. 5B depicts an image of an example object unaffected by specular reflection, in accordance with the disclosed techniques.

FIG. 5B depicts an image 510 an example object unaffected by specular reflection. The image 510 includes the label 502 with the barcode 504 that is unilluminated by the illumination source (e.g., the illumination source 251, the light sources 425) during an image capture operation (e.g., the image capture operation 413). The image 510 may be representative of the types of images the disclosed systems and methods are configured to capture to mitigate or avoid specular reflection, by performing the image capture operation with the illumination source deenergized in situations that may other result in images affected by specular reflection. For example, a ranging operation (e.g., the ranging operation 403) may provide a range value that, when compared to a threshold range value, indicates the label 502 is at a distance that may cause specular reflection of the label 502 during image capture. Similarly, the range value may be associated with a focus position value that indicates (e.g., based upon a corresponding close-in focal zone to the imaging device) performing an image capture operation may cause specular reflection of the label 502 in the capture images.

FIG. 6 depicts a flow diagram of an example method 600 for mitigating specular reflection, according to techniques disclosed herein. The method 600 may be performed via the imaging device 200, the controller 258, 405, the imaging assembly 245, 415, an illumination assembly (e.g., the illumination source 251, the light sources 425, and/or other suitable imaging devices and/or components.

The method 600 may include performing a ranging operation via an imaging assembly having a field of view (block 610).

The method 600 may include determining a range value associated with a distance between the imaging assembly and an object in the field of view based upon the ranging operation (block 620). The range value may include one or more of a distance value or a focus position value.

The method 600 may include comparing the range value to a threshold range value stored locally in a memory of the imaging assembly (block 630). The threshold range value may be configured by a user.

The method 600 may include, responsive to the range value not exceeding the threshold range value, performing a decode operation (block 640). The decode operation may include (i) capturing, via the imaging assembly having an illumination assembly that is not energized, image data comprising one or more images of the object in the field of view, (ii) providing the image data of at least one image of the one or more images to a decoding module, and (iii) analyzing the image data of the at least one image via the decoding module to decode an indicia contained within at least one image. In some such implementations, responsive to the range value not exceeding the threshold range value, performing the decode operation may include capturing, via the imaging assembly that is energized to provide less than maximum illumination, the image data comprising the one or more images of the object in the field of view. In at least some implementations, the method 600 may include determining a specular reflection mode associated with the imaging assembly is activated, wherein performing the decode operation (block 640) is further based upon the specular reflection mode of the imaging assembly being activated.

The method 600 may include, responsive to decoding the indicia contained within the at least one image, causing the decode operation to be terminated (block 650). Causing the decode operation to be terminated may be based upon a termination assembly.

In at least some implementations of the method 600, performing the ranging operation (block 610) may include (i) energizing an aiming light source configured to project an aiming light into the field of view; (ii) capturing, via the imaging assembly, ranging image data comprising one or more ranging frames of the field of view containing the aiming light; and (iii) analyzing a position of the aiming light in the one or more ranging frames to determine the range value.

In at least some implementations of the method 600, the ranging operation is a second ranging operation, the decode operation is a second decode operation. In some such implementations, the method 600 may include (i) performing a first ranging operation of the imaging assembly; (ii) based upon the first ranging operation, determining a first range value associated with the distance between the imaging assembly and the object; (iii) performing a first decode operation that may include (a) capturing, via the imaging assembly having the illumination assembly that is energized and based upon the first range value, first image data comprising a first set of one or more images of the object in the field of view, (b) providing the first image data of at least one image of the first set of one or more images to the decoding module, and (c) analyzing the first image data of the at least one image via the decoding module to decode the indicia contained within the at least one image of the first image data; and (iv) responsive to not decoding the indicia contained within the first image data, performing the second ranging operation. In some such implementations, the cause of not decoding the indicia may be specular reflection caused by illumination of the object via the illumination assembly during capture of the at least one image of the first image data.

In at least some implementations, responsive to not decoding the indicia contained within the at least one image, of the method 600 may include (i) performing a second ranging operation of the imaging assembly; (ii) based upon the second ranging operation, determining a second range value associated with the distance between the imaging assembly and the object; and (iii) performing a second decode operation based upon the second range value, wherein the illumination assembly is energized while capturing image data of the object in the field of view.

In at least some implementations, subsequent to capturing the one or more images, the method 600 may include determining a ranking value of each image of the one or more images, wherein the ranking value is associated with a predicted likelihood of successful decode of a respective each image, and determining the at least one image of the one or more images to provide to the decoding module based upon respective ranking values of the one or more images, the at least one image having a greater predicted likelihood of successful decode than at least one other image of the one or more images.

It should be understood that not all blocks of the exemplary flow diagram of FIG. 6 are required to be performed.

It will be understood that the foregoing represents one potential implementation, and that other implementations may be envisioned. For example, in at least some implementations, a bioptic barcode scanner may be used as the imaging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "config-ured" in a certain way is configured in at least that way, but may also be configured in ways that are not listed.

The Abstract of the Disclosure is provided to allow the reader to quickly ascertain the nature of the technical dis-closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A system for mitigating specular reflection, the system comprising:

an imaging assembly having a field of view;

one or more processors; and a memory associated with a particular imaging device storing instructions that, when executed by the one or more processors, cause the one or more processors to:

perform a ranging operation via the imaging assembly;

based upon the ranging operation, determine a range value associated with a distance between the imaging assembly and an object in the field of view;

compare the range value to a threshold range value stored locally in a memory of the imaging assembly;

responsive to the range value not exceeding the thresh-old range value, perform a decode operation com-prising;

capturing, via the imaging assembly having an illu-mination assembly that is not energized, image data comprising one or more images of the object in the field of view, providing the image data of at least one image of the one or more images to a decoding module, and analyzing the image data of the at least one image via the decoding module to decode an indicia con-tained within the at least one image; and responsive to decoding the indicia contained within the at least one image, cause the decode operation to be terminated, wherein the ranging operation is a second ranging opera-tion, the decode operation is a second decode operation, and the system further comprises instructions that, when executed by the one or more processors, cause the one or more processors to:

perform a first ranging operation via the imaging assem-bly;

based upon the first ranging operation, determine a first range value associated with the distance between the imaging assembly and the object;

perform a first decode operation comprising;

capturing, via the imaging assembly having the illumi-nation assembly that is energized and based upon the first range value, first image data comprising a first set of one or more images of the object in the field of view, providing the first image data of at least one image of the first set of one or more images to the decoding module, and analyzing the first image data of the at least one image via the decoding module to decode the indicia con-tained within the at least one image of the first image data; and responsive to not decoding the indicia contained within the first image data, perform the second ranging operation.

2. The system of claim 1, wherein to perform the ranging operation comprises instructions that, when executed by the one or more processors, cause the one or more processors to:

energize an aiming light source configured to project an aiming light into the field of view;

capture, via the imaging assembly, ranging image data comprising one or more ranging frames of the field of view containing the aiming light; and analyze a position of the aiming light in the one or more ranging frames to determine the range value.

3. The system of claim 1, wherein the range value includes one or more of a distance value or a focus position value.

4. The system of claim 1, wherein the threshold range value is configured by a user.

5. The system of claim 1, wherein a cause of not decoding the indicia is specular reflection caused by illumination of the object via the illumination assembly during capture of the at least one image of the first image data.

6. The system of claim 1, further comprising instructions that, when executed by the one or more processors, cause the one or more processors to:

determine a specular reflection mode associated with the imaging assembly is activated, wherein performing the decode operation is further based upon the specular reflection mode of the imaging assembly being acti-vated.

7. The system of claim 1, further comprising instructions that, when executed by the one or more processors, cause the one or more processors to:

subsequent to capturing the one or more images, deter-mine a ranking value of each image of the one or more images, wherein the ranking value is associated with a predicted likelihood of successful decode of a respec-tive each image; and determine the at least one image of the one or more images to provide to the decoding module based upon respective ranking values of the one or more images, the at least one image having a greater predicted likelihood of successful decode than at least one other image of the one or more images.

8. The system of claim 1, wherein to cause the decode operation to be terminated is based upon a termination assembly.

9. The system of claim 1, wherein responsive to the range value not exceeding the threshold range value, to perform the decode operation further comprises instructions that, when executed by the one or more processors, cause the one or more processors to:

capture, via the imaging assembly that is energized to provide less than maximum illumination, the image data comprising the one or more images of the object in the field of view.

10. A method for mitigating specular reflection, the method comprising:

performing a ranging operation via an imaging assembly having a field of view;

based upon the ranging operation, determining a range value associated with a distance between the imaging assembly and an object in the field of view;

comparing the range value to a threshold range value stored locally in a memory of the imaging assembly;

responsive to the range value not exceeding the threshold range value, performing a decode operation comprising;

capturing, via the imaging assembly having an illumination assembly that is not energized, image data comprising one or more images of the object in the field of view, providing the image data of at least one image of the one or more images to a decoding module, and analyzing the image data of the at least one image via the decoding module to decode an indicia contained within the at least one image; and responsive to decoding the indicia contained within the at least one image, causing the decode operation to be terminated; and responsive to not decoding the indicia contained within the at least one image, performing a second ranging operation of the imaging assembly;

based upon the second ranging operation, determining a second range value associated with the distance between the imaging assembly and the object; and performing a second decode operation based upon the second range value, wherein the illumination assembly is energized while capturing image data of the object in the field of view.

11. The method of claim 10, wherein performing the ranging operation comprises:

energizing an aiming light source configured to project an aiming light into the field of view;

capturing, via the imaging assembly, ranging image data comprising one or more ranging frames of the field of view containing the aiming light; and analyzing a position of the aiming light in the one or more ranging frames to determine the range value.

12. The method of claim 10, wherein the range value includes one or more of a distance value or a focus position value.

13. The method of claim 10, wherein the threshold range value is configured by a user.

14. The method of claim 10, further comprising:

determining a specular reflection mode associated with the imaging assembly is activated, wherein performing the decode operation is further based upon the specular reflection mode of the imaging assembly being activated.

15. The method of claim 10, further comprising:

subsequent to capturing the one or more images, determining a ranking value of each image of the one or more images, wherein the ranking value is associated with a predicted likelihood of successful decode of a respective each image; and determining the at least one image of the one or more images to provide to the decoding module based upon respective ranking values of the one or more images, the at least one image having a greater predicted likelihood of successful decode than at least one other image of the one or more images.

\* \* \* \* \*